March 13, 1934.  P. SCHLUMBOHM  1,951,213
COLOR FILTER MIRROR
Filed May 21, 1932

INVENTOR
Peter Schlumbohm
BY
ATTORNEY

Patented Mar. 13, 1934

1,951,213

UNITED STATES PATENT OFFICE 1,951,213

COLOR-FILTER-MIRROR

Peter Schlumbohm, Berlin, Germany

Application May 21, 1932, Serial No. 612,831
In Germany January 25, 1932

5 Claims. (Cl. 88—1)

The combination of a mirror with a color filter is known and furthermore toilet mirrors of this kind have preferably been made out of a silvered glass sheet, this glass sheet working as a color filter. Such a toilet mirror has been made for instance to show the photo effect of make-up and to be used as a make-up mirror for movie actors.

My present invention relates to a specific toilet mirror with a color filter adapted for the purpose of giving a daylight-effect reflection of a person's face in an artificially-lighted room. A woman who in the lamplight of her room is dressing and getting ready for taking a walk shall see under these light conditions in her room how she and especially her face will look in the daylight of the street.

When attempting to make such a mirror with the information disclosed in the previous patent about color filter-mirrors no success could be obtained. A color-filter-mirror, the color-filter of which was composed following the rules of theoretical reckoning about spectral permeability, while apparently wholly correct, was found to be practically unusable. A mirror with such a filter made of such a glass was found by testing a persons to be unsatisfactory not only as to the impression of the colors of the face but the general whole impression and the intensity of the image.

By my new invention the mistakes are eliminated which prevented success in the normal ways and experiments in constructing such a mirror. By my invention for the first time a toilet mirror for the specific purpose mentioned above has been materialized.

Figure 1:
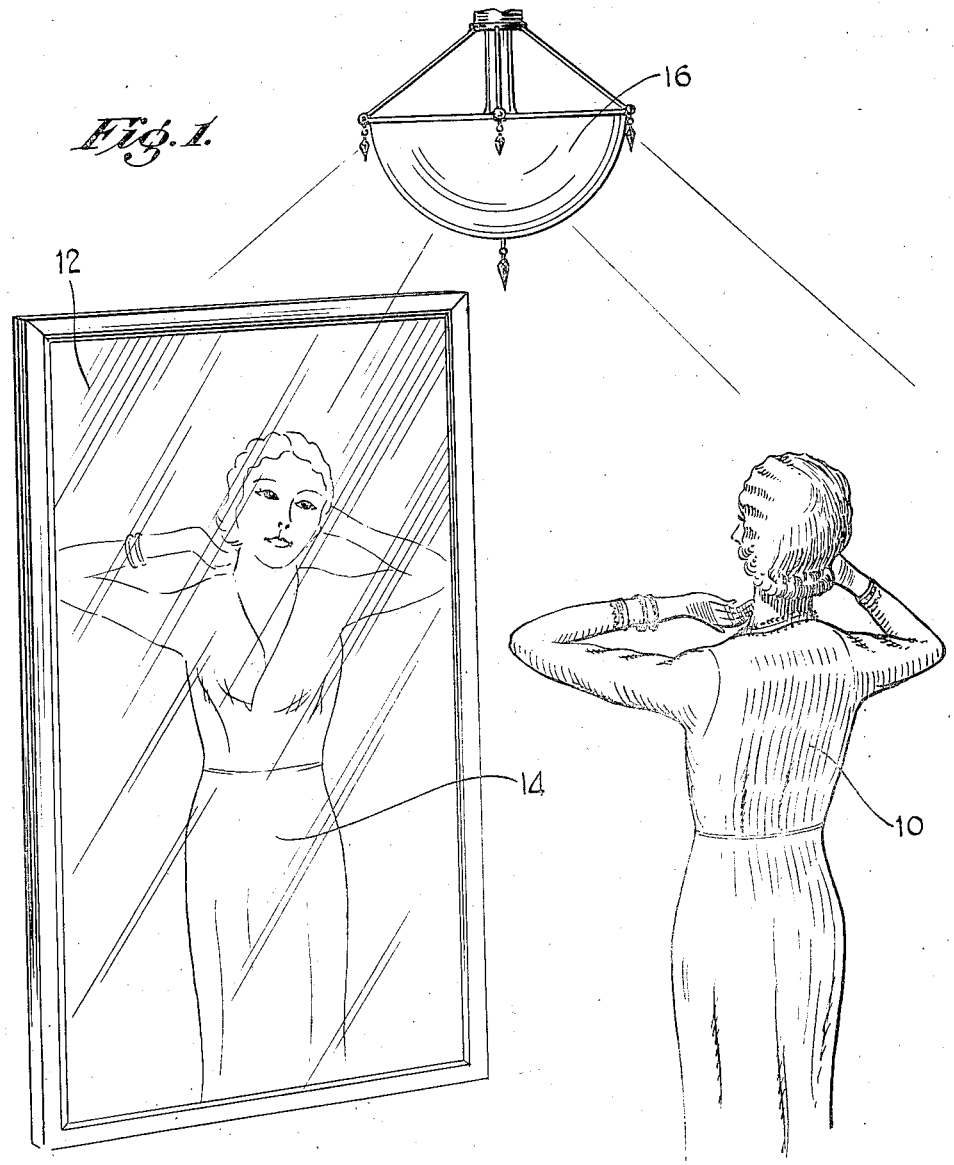
Figure 2:
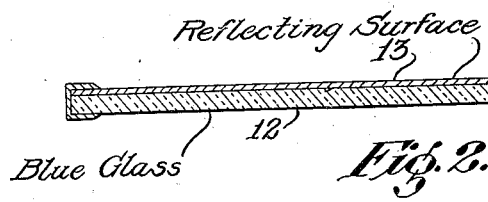

In the present embodiment of my invention of which the attached drawing is illustrative, Figure 1 is a perspective of the mirror and related light and object;

Figure 2 is a substantially horizontal cross section through the mirror.

The invention is based on the thought that the psychological factors in this case are more important than the mathematical and physical factors of the problem. I therefore decided to select the filter for such a toilet mirror from this point of view. A method was worked out which permitted control of these psychological factors and made possible the selection of the "right" toilet mirror from a large number of trial filters and trial glasses.

Such a psychological method will be explained in detail: A testing person was placed in such a way that the one side of the face was lighted by daylight while the other side of the face was lighted by lamplight. In order to separate the two lights a screen was made which was placed vertically in the line of the nose, and which was cut following the profile of the testing person. Opposite the eyes of the testing person, two mirrors were placed, one mirror on each side of the screen. The mirror on the daylight side of the face and screen was a normal white mirror without a color filter; the mirror on the other side of the face and screen, lighted up by an electric lamp, was a trial mirror with a color filter.

Now: the color-filter mirror is "correct" and "all-right" if the testing person judges the two different images in the two different mirrors to be equal. It is practical to make the tests with a daylight of a medium intensity.

The new mirror 12, having the reflecting back surface 13, has a coloring matter giving the glass a bluish tint. It can therefore be characterized by the effects that the image 14 of the face of the person 10 which is artificially lighted by the lamp 16 is equal to the image of the same person's face in a normal white mirror if in this latter case the person's face is illuminated by daylight.

Daylight is characterized as having a preponderance of rays of the shorter wave lengths including violet, indigo, blue and a relatively smaller percentage of rays of the longer wave lengths including red. Artificial light as referred to is characterized as having a great predominance of rays of longer wave length including yellow, orange, red, and a very small percentage of rays of the shorter wave lengths including violet, indigo, blue.

Of the several methods for making the daylight filter glass I prefer the addition of a mixture of copperoxyd and cobaltoxyd to the glass. For the making of my product two factors in the formula are of importance: the relation of the copperoxyd to the cobaltoxyd and the concentration of the mixture of the two substances in the glass.

I consider a proportion of copperoxyd: cobaltoxyd=1:1 to be the optimum proportion for the said purpose.

As far as the concentration of the color in its proportion to the glass is concerned, it is a matter of fact that the percent of concentration by weight relates to a particular thickness of the glass, since the quality of the filter changes with the thickness of the glass. The best concentration for the glass of the mirror is for a thickness of 3 mm. with the following concentration. I have also given a formula for a glass which can be used for the mirror.

*Formula for a glass of 3 mm. thickness*

Glass:
| | Percent |
|---|---|
| $SiO_2$ | 74 |
| CaO | 11 |
| $K_2O$ | 4 |
| $Na_2O$ | 11 |

Coloring:
| | |
|---|---|
| CuO | 0.025 |
| CoO | 0.025 |

Having now described my invention and having disclosed the method how to make and how to test such a new mirror, I claim:

What I claim is:

1. A toilet mirror of the class described, comprising a glass having a reflecting material on one side thereof, said glass having a coloring matter therein rendering the glass capable of absorbing a portion of light waves reflected from an object illuminated by artificial light which contains a greater proportion of longer waves to short waves than daylight, the quantity and quality of said coloring matter being sufficient to absorb such a portion of said longer waves as will cause the mirror to reflect an image of the object in light having approximately the same proportion of long waves to short waves as daylight, whereby the image will appear the same as though the object were illuminated by daylight and the image were seen in a normal glass.

2. A toilet mirror of the class described, comprising a glass having a reflecting material on one side thereof, said glass having a coloring matter therein rendering the glass capable of absorbing a portion of light waves reflected from an object illuminated by artificial light which contains a greater proportion of longer waves to short waves than daylight, the quantity and quality of said coloring matter being sufficient to absorb such a portion of said longer waves as will cause the mirror to reflect an image of the object in light having approximately the same proportion of long waves to short waves as daylight, whereby the image will appear the same as though the object were illuminated by daylight and the image were seen in a normal glass, said amount of coloring matter being less than the theoretical requirement determined on the spectral permeability of the glass.

3. A mirror as claimed in claim 1, the glass of said mirror having approximately the formula $SiO_2$, 74%; CaO, 11%; $K_2O$, 4% and $Na_2O$, 11%, said glass having added thereto a mixture of cobalt oxide and copper oxide in equal proportions in a relatively small amount as compared to the weight of the glass.

4. A mirror as claimed in claim 1, the glass of said mirror having substantially the formula 74%, $SiO_2$; 11% CaO; 4%, $K_2O$ and 11%, $Na_2O$, said glass having a coloring substance embodied therein consisting of approximately .025% by weight of cobalt oxide and .025% by weight of copper oxide, said glass having a thickness of approximately 3 mm.

5. A toilet mirror of the class described, comprising a glass having a reflecting material on one side thereof, said glass having a coloring matter therein rendering the glass capable of absorbing a portion of light waves reflected from an object illuminated by artificial light which contains a greater proportion of longer waves to short waves than daylight, the quantity and quality of said coloring matter being sufficient to absorb such a portion of said longer waves as will cause the mirror to reflect an image of the object in light having a balance of short and long waves adapted to make the reflected image appear substantially as if the object were illuminated by daylight and viewed in an ordinary mirror.

PETER SCHLUMBOHM.